US012440853B2

(12) United States Patent
Maucher et al.

(10) Patent No.: US 12,440,853 B2
(45) Date of Patent: Oct. 14, 2025

(54) CENTRIFUGE UNIT FOR A MICROFLUIDIC DEVICE FOR PROCESSING LIQUID SAMPLES

(71) Applicant: Robert Bosch GmbH, Stuttgart (DE)

(72) Inventors: Tanja Maucher, Stuttgart (DE); Franz Laermer, Weil der Stadt (DE); Hannah Bott, Straubenhardt (DE)

(73) Assignee: Robert Bosch GmbH, Stuttgart (DE)

( * ) Notice: Subject to any disclaimer, the term of this patent is extended or adjusted under 35 U.S.C. 154(b) by 891 days.

(21) Appl. No.: 17/753,422

(22) PCT Filed: Aug. 18, 2020

(86) PCT No.: PCT/EP2020/073042
§ 371 (c)(1),
(2) Date: Mar. 2, 2022

(87) PCT Pub. No.: WO2021/043567
PCT Pub. Date: Mar. 11, 2021

(65) Prior Publication Data

US 2022/0314239 A1 Oct. 6, 2022

(30) Foreign Application Priority Data

Sep. 3, 2019 (DE) ..................... 10 2019 213 313.4

(51) Int. Cl.
*B04B 11/04* (2006.01)
*B04B 5/00* (2006.01)
*F16K 99/00* (2006.01)

(52) U.S. Cl.
CPC ................ *B04B 11/04* (2013.01); *B04B 5/00* (2013.01); *F16K 99/0063* (2013.01)

(58) Field of Classification Search
CPC ......... B04B 11/04; B04B 5/00; B04B 5/0407; F16K 99/0063; B01L 13/00; B01L 2200/0689; B01L 2400/0409; B01L 2400/065; B01L 2400/0677; B01L 3/5021; B01L 3/502738
See application file for complete search history.

(56) References Cited

U.S. PATENT DOCUMENTS

2006/0240964 A1 10/2006 Lolachi et al.
2011/0318728 A1* 12/2011 Phan ................. G01N 35/1002 435/6.15

(Continued)

FOREIGN PATENT DOCUMENTS

DE 10 2010 003 223 A1 9/2011
DE 10 2015 203 779 A1 9/2016
DE 10 2016 222 072 A1 5/2018

(Continued)

OTHER PUBLICATIONS

English Translation of EP2926906A1 (Year: 2025).*

(Continued)

*Primary Examiner* — Jennifer Wecker
*Assistant Examiner* — Steven Ray Castaneda
(74) *Attorney, Agent, or Firm* — Maginot, Moore & Beck LLP

(57) ABSTRACT

A centrifuge unit for a microfluidic device for processing liquid samples includes a centrifuge cup and at least one centripetal force-dependent valve function.

15 Claims, 3 Drawing Sheets

(56) References Cited

U.S. PATENT DOCUMENTS

| | | | | |
|---|---|---|---|---|
| 2013/0252796 | A1* | 9/2013 | Von Stetten | B01L 3/5025<br>494/37 |
| 2013/0344496 | A1 | 12/2013 | Peytavi et al. | |

FOREIGN PATENT DOCUMENTS

| | | | | | |
|---|---|---|---|---|---|
| EP | 2 926 906 | A1 | | 10/2015 | |
| GB | 1589388 | A | * | 5/1981 | B04B 1/10 |
| KR | 10-2018-0009602 | A | | 1/2018 | |

OTHER PUBLICATIONS

International Search Report corresponding to International Patent Application No. PCT/EP2020/073042, mailed Oct. 13, 2020 (German and English language document) (6 pages).

Jeon, H. J. et al., "Development of a 3D circular microfluidic centrifuge for the separation of mixed particles by using their different centrifuge times," Sep. 2015, Journal of Micromechanics and Microengineering, vol. 25, No. 114001, (8 pages).

* cited by examiner

CENTRIFUGE UNIT FOR A MICROFLUIDIC DEVICE FOR PROCESSING LIQUID SAMPLES

This application is a 35 U.S.C. § 371 National Stage Application of PCT/EP2020/073042, filed on Aug. 18, 2020, which claims the benefit of priority to Serial No. DE 10 2019 213 313.4, filed on Sep. 3, 2019 in Germany, the disclosures of which are incorporated herein by reference in their entirety.

The present disclosure relates to a centrifuge unit for a microfluidic device for the processing of liquid samples, to a microfluidic device for the processing of liquid samples incorporating such a centrifuge unit, and to a method for operating a centrifuge unit of this kind, and to use of a microfluidic device with incorporated centrifuge unit.

BACKGROUND

There are microfluidic devices known which, as so-called Lab-on-a-Chip (LoC) systems, accommodate the entire functionality of a macroscopic laboratory on, for example, a substrate the size of a credit card: using such systems, it is possible to conduct complex biochemical or microbiological tests and investigations in a miniaturized and automated form. For example, the Vivalytic® platform (Robert Bosch GmbH) offers a universal diagnostic platform allowing various single or multiplex tests to be performed in a cartridge.

Conventional processing protocols frequently require centrifuging steps—for example, generally for the separation of cells or for the removal of unwanted blood constituents, such as erythrocytes, from a whole blood sample. In microfluidic devices, filters (e.g., glass frits) may be used, for example, as an alternative for a centrifuging step. Such filters, however, are unable to reproduce the function of a centrifuge to the full extent. Moreover, such filters become clogged very easily and are then unusable. To prevent such problems it is common for required centrifuging steps, in the processing of a whole blood sample, for example, to precede the automated processing of the sample in a microfluidic device, and to be carried out externally and separately.

SUMMARY

The disclosure describes a centrifuge unit for a microfluidic device for the processing of liquid samples, the centrifuge unit being characterized by a centrifuge cup and at least one centripetal force-dependent valve function. The disclosure further provides for the integration of a mini-centrifuge into a microfluidic device, more particularly a lab-on-a-chip device. In a particularly advantageous way, the integration of the centrifuge unit into the microfluidic device allows a workflow, in the processing of the liquid samples, that comprises a fully-fledged centrifuging step or, where appropriate, two or more centrifuging steps. In a fully automatable way, accordingly, whole blood samples, for example, can be processed, allowing all of the cellular material (blood cells) to be removed from whole blood and allowing the cell-free blood plasma to be extracted, for example. It is also possible, for example, for particular blood cells, erythrocytes for example, to be removed by selective lysis and centrifugation by means of the centrifuge unit within the microfluidic device, and discarded, with the remaining cells, erythrocytes for example, being lyzed for the extraction of nucleic acids, for example, and coupled into the channel system of the microfluidic device and processed further. The centrifuge unit integratable into the microfluidic device makes it much easier overall to process liquid samples, since there is no need for upstream centrifuging steps, to be carried out externally, and the centrifuging steps can be integrated into the automatable processing of the sample within the microfluidic device.

The centrifuge unit is intended in particular for integration into a sample input chamber of the microfluidic device. In principle the centrifuge unit or, where appropriate, two or more centrifuge units may also be integrated at other positions within a microfluidic device. The centrifuge cup may be mounted rotatably between two layers of the device in particular by means of a spindle, as for example a spindle made of metal (metal needle) or made of plastic. Generally speaking, microfluidic devices of the generic type are constructed of two or more plastics layers, made of polycarbonate, for example, allowing the centrifuge unit to be integrated without particular complexity. A simple indentation within the layers or a plastics bearing is generally stable enough to accommodate the spindle, since the operating times of the centrifuge unit in the device are in general comparatively short.

The microfluidic network of a microfluidic device is generally realized by channel structures within the layers, which are achieved, for example, through surface structurings or through welding-on of structuring elements. In addition there are covering and sealing layers and also optionally elastic and/or pneumatic layers generally provided. Such microfluidic devices may be produced in the form of a cartridge, for example, and may be intended for single or multiple use. The integration of a centrifuge unit in accordance with the disclosure is usefully accomplished during the actual assembly of a microfluidic device, with the centrifuge unit being installed at the intended position and optionally adjusted, manually or by means of an industrial robot, for example, before the final welding-together of the layers.

For the rotation of the centrifuge cup, there may in particular be a mechanical drive and/or a magnetic drive and/or a pneumatic drive provided. For example, the cup may be driven via a direct mechanical intervention of a drive motor into the microfluidic device, in which case a suitably configured mechanical "driver" or, for example, a magnetic coupling, involving small magnets, for example, may be provided between the centrifuge cup and an external motor. Driving may also be accomplished, for example, by means of a magnetic rotational field of a drive motor, which acts from externally, for example, on a small magnet within the centrifuge cup and moves the cup like a synchronous motor. Additionally possible, for example, is a pneumatic drive, with compressed air acting, for example, on turbine blades on or below the centrifuge cup. There is often already provision of compressed air for the operation of a microfluidic device otherwise, particularly for the actuation of pneumatic valves and pump membranes, with a pneumatic pressure of 1.5 bar, for example. This pressure may also be utilized for the drive or rotation of the centrifuge cup. Turbine blades allow the velocity of the air flow from the pneumatic function to be converted directly into a rotational movement of the centrifuge cup.

The centripetal force-dependent valve function of the centrifuge unit comprises more particularly a reversible valve function, allowing the valve to be opened or closed in dependence on the acting centripetal force. The valve function can therefore be controlled or actuated via the rotational speed of the centrifuge unit.

The centripetal force-dependent valve function may be realized, for example, by a sealing ring. The sealing ring for example may be arranged internally in the upper region of the centrifuge cup. For the removal of cellular material from a sample, the centrifuge unit with the sample liquid located therein can first, for example, be rotated at a first speed in the medium speed range. As a result of the acting centripetal forces, the sample liquid lies against the wall of the centrifuge cup in the manner of a uniform column. Since liquids are incompressible, the centripetal force exerts a pressure on the mass of the rotating liquid that prevails throughout the liquid, and hence also on the sealing face of the sealing ring (O-ring) to the centrifuge cup wall. Up to a certain threshold value of the acting centripetal forces, this sealing face withstands the prevailing pressure, allowing centrifugation to take place at the corresponding speed over a certain period until all of the cellular constituents have deposited on the centrifuge cup wall. When this condition is reached, the speed of the centrifuge cup is increased, and so the threshold value of the sealing ring sealing effect is exceeded at the sealing face, and the liquid freed from cellular constituents (for example, blood plasma after centrifugation of a whole blood sample) is pressed through the sealing face between sealing ring and internal cup wall and leaves the centrifuge cup. The liquid can then be coupled into corresponding channels of the microfluidic device.

In another, particularly preferred embodiment of the centripetal force-dependent valve function, there are openings provided in the centrifuge cup which, by way of a sealing ring externally surrounding the centrifuge cup, are exposed or closed reversibly as a function of the acting centripetal force. In this configuration, the centrifuge cup in the upper region usefully has an internally projecting rim which prevents the upward escape of the liquid from the centrifuge cup when the centrifuge cup is rotated. As centripetal forces increase, the sealing ring is stretched away from the sealing face, and so the sealing force on the external face of the centrifuge cup is reduced. Advantageous in this context is a relatively supple material for the sealing ring, which is easily stretched on exposure to the centripetal force. An alternative possibility is to use, for example, sprung valve flaps or valve balls (flap valves or ball valves) which open to the outside, for example, which are opened by the acting centripetal force when the centrifuge cup reaches a particular speed.

In a further, particularly preferred configuration, the valve function is formed by at least one opening in the wall of the centrifuge cup, in which a bolt passing through the centrifuge cup wall is movably arranged. Outside the centrifuge cup, the bolt is equipped with a bolt head and with a sealing ring arranged below the bolt head, and so by this means the opening is closed when the centripetal force is absent or, where appropriate, low. Within the centrifuge cup the bolt is held in a sealing position by a secured compression spring (return spring). The spring force is set such that the sealing position exists below a predeterminable centripetal force. As soon as the centripetal force exceeds a particular threshold value, the bolt head is removed from the opening in the centrifuge cup wall, and so the sealing position is relinquished and liquid is able to emerge from the centrifuge cup.

The compression spring may be secured, for example, by a locknut, which is mounted on a thread of the bolt (screw thread) in the interior of the centrifuge cup. The threshold value for the speed or for the centripetal force from which the one or more valves open is determined in particular by the mass of the bolt and, where appropriate, of the locknut. The threshold value is additionally determined by the spring force of the compression spring and by the position of the locknut on the thread of the bolt, which influences the pretension of the compression spring or of the return spring. By means of the position of the locknut, accordingly, it is possible to set the retaining force of the spring. Through selection of appropriate bolts (or screws) and locknuts and/or the masses thereof, and also of springs with greater or lesser stiffness, and corresponding setting (positioning) of the locknut on the thread, it is possible to achieve a precise setting of the valve function in dependence on the acting centripetal force. If, for example, there are two or more such valves provided for a centrifuge cup, three valves for example, it is possible to set all of the valves precisely to open and close again at exactly the same desired speed. Suitable components for the valve construction include, in particular, biocompatible materials, examples being stainless steel or noncorroding steel, plastics, or titanium.

In the case of a rotation below the threshold speed value, the sample material is centrifuged within the centrifuge cup. If the threshold speed valve is exceeded, the valve function is triggered and the centrifuged liquid is able to cross quickly and in a well-defined and controlled way into the microfluidic network of the device.

The respective nature of the configuration of the valve function dictates the threshold value magnitude of the centripetal force at which the valve function is triggered or which when exceeded is accompanied by opening of the valve and which when undershot is accompanied by the valve closing again in the case of a reversible valve function. The centripetal force in this context is a product of the centripetal acceleration and the mass. The valve function may be configured, for example, such that the valve opens at a centripetal acceleration of around 400-500 g. In the case of an internal centrifuge cup diameter of, for example, 8 mm and a liquid film in the centrifuge cup of around 1 mm in thickness, this would correspond to around 10 000 rpm. The valve function may also be configured such that the opening of the valve requires higher centripetal accelerations, for example around 3500-4000 g (corresponding to around 30 000 rpm in the case of the internal diameter referred to above) or about 4500-5000 g (corresponding to around 35 000 rpm in the case of the internal diameter referred to above).

In a further configuration of the centrifuge unit, the valve function is an irreversible valve function, in which case preferably the irreversible valve function is provided additionally to a reversible valve function. The irreversible valve function may be realized, for example, by a foil and/or a stopper or the like, closing off one or more openings in the wall of the centrifuge cup. At and above a particular centripetal force, the foil opens or the stopper loosens, and so the opening is exposed for the passage of a liquid. This irreversible valve function is advantageous in particular for complete, very largely loss-free liquid transfer, allowing the centrifuge cup, for example, to be emptied completely and rapidly. If both reversible and irreversible valve functions are provided, the irreversible valve function is preferably triggered at a higher centripetal force than the reversible valve function. For example, the reversible valve function may be intended for repeated rinsing of the centrifuge cup (for a threshold speed value of 10 000 rpm, for example), and the irreversible valve function may be utilized at a very high speed, at 30 000 or 35 000 rpm for example, for the final complete emptying of the centrifuge cup.

In a further preferred configuration of the centrifuge unit, the internal surface of the centrifuge cup is equipped at least partly with surface structures for the adherence of sample constituents. By means of such roughnesses or nanostructures or, for example, indentations made in a targeted way in the inner wall of the centrifuge cup, it is possible to provide further support to the additional adhesion of, for example, cells or constituents of the sample on the internal surface of the centrifuge cup, allowing the selectivity of the centrifuging step to be improved further.

The disclosure additionally comprises a microfluidic device for the processing of liquid samples, where the device incorporates one or more of the centrifuge units described.

During the processing, the centrifuge cup is preferably oriented together with the microfluidic device or the lab-on-chip cartridge with preferably a particular tilt angle: for example, at a tilt angle between 10 and 50°, preferably about 30°. A tilt angle of this kind facilitates the passage of liquid from the centrifuge cup into the fluidic network of the lab-on-chip cartridge. For this purpose one option is to arrange the centrifuge cup itself with the tilt angle in relation to the microfluidic device. In other, particularly preferred embodiments, the microfluidic device itself is oriented with a corresponding tilt angle within a processing apparatus. This has the advantage that the further transport of liquid within the microfluidic device can also be assisted by the acting gravitational force.

If the centrifuge unit is integrated into a sample input chamber of the device, the centrifuging step may be carried out as a first step in the processing of the sample. Depending on the desired sequence of the processing to be carried out, however, it is also entirely possible to integrate the centrifuge unit, alternatively or additionally, at another location in the device. The integration of the centrifuge unit into the device and the further configuration of the fluidic network of the device are in this case configured such that the centrifugate from the centrifuge cup can be coupled into the fluidic network of the device in the desired and necessary way. Provision is additionally made preferably for the integration position of the centrifuge unit—that is, for example, the sample input chamber—to have a further fluidic entry, via which liquids can be introduced into the device independently of the centrifuge unit, in other words without having to transit the centrifuge cup. In this way, for example, a rinsing operation may be performed on the centrifuge unit. Additionally there is provision, preferably, for the centrifuge unit to be able to be flooded with a further liquid after a centrifugation, for example, and hence for the centrifuge cup to be able to be refilled, in order to allow multiple rinsing steps of the centrifuge unit itself to be performed, for example.

In adaptation to the dimensions of the microfluidic device, the centrifuge unit is also dimensioned correspondingly. For commercially customary microfluidic devices, for example, centrifuge units can be employed whose centrifuge cup has a diameter and/or a height of about 5 to 20 mm, preferably about 5 to 15 mm, for example about 10 mm in external diameter and about 8 mm in internal diameter. Depending on the nature and the dimensioning of the microfluidic device itself and on the particular application, adaptations to the dimensions of the centrifuge unit are possible.

The disclosure further comprises a method for operating the described centrifuge units within a microfluidic device, where after introduction of the sample into the centrifuge cup, the centrifuge cup is rotated at a first speed in a first phase. The centrifuge cup is rotated at a second, increased speed in a subsequent second phase, where the increased speed causes actuation of the at least one centripetal force-dependent valve function of the centrifuge unit. These phases can be repeated in order to perform rinsing operations, for example. Provision may additionally be made for further valve functions to be provided in the centrifuge unit, which can be triggered, for example, in the case of a further-increased speed. In the method, for example, there may be a subsequent third phase, in which rotation is carried out at a third, further-increased speed, leading to the triggering, for example, of an irreversible valve function allowing the centrifuge cup to be emptied quickly and completely.

In the method there is preferably provision for the centrifuge cup to be flooded with new liquid one or more times. As a result of the repeated, targeted introduction of liquid(s), various processes in the centrifuge cup can be performed in an automatable way. There may be single or multiple rinsing operations, for example. A further possibility is, through corresponding choice of the medium or of the liquid to be introduced, to trigger lysis operations or other operations in the centrifuge cup, for example, in order to digest cells and/or to trigger particular enzymatic processes, for example. The constituents of the sample may subsequently be separated by centrifugation within the centrifuge cup and the supernatant may be removed from the centrifuge cup in a manner controlled by the speed, and either discarded or else coupled into the channel system of the device for further processing.

The disclosure, lastly, comprises the use of the microfluidic device described, incorporating at least one centrifuge unit in accordance with the description above, where the device is employed for separating cellular constituents of a sample and/or for lyzing cellular constituents and/or for selectively isolating particular cellular constituents and/or their lysates. By means of the device described, for example, cellular material can be separated from a whole blood sample and the cell-free blood plasma can be recovered and used further. The device may be utilized, additionally, in order to remove erythrocytes, for example, from a whole blood sample, for the purpose subsequently of isolating the remaining cells, leucocytes, for example, and possibly processing them further. For example, the leucocytes may be subsequently lyzed and their nucleic acids extracted.

BRIEF DESCRIPTION OF THE DRAWINGS

Further features and advantages of the disclosure are apparent from the description hereinafter of exemplary embodiments in conjunction with the drawings. The individual features here may each be actualized by themselves or in combination with one another.

In the Drawings.

DETAILED DESCRIPTION

Figure 1:
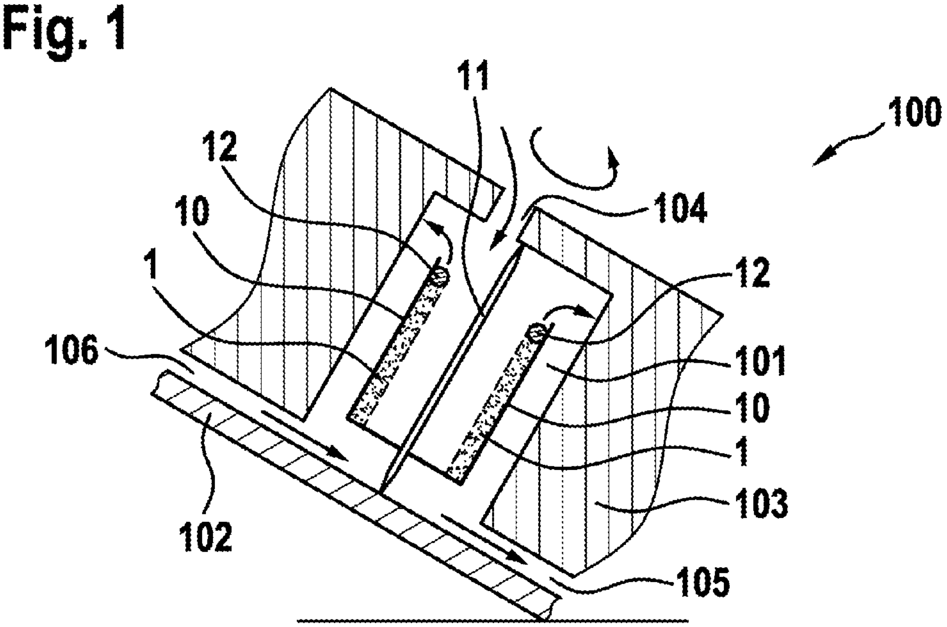
FIG. 1 shows a schematic section through a part of a microfluidic device with integrated centrifuge unit according to a first embodiment.

FIG. 1 shows, schematically, the integration of the centrifuge unit with the centrifuge cup 10 within a sample input chamber 101 of a microfluidic device 100. The centrifuge cup 10 is mounted rotatably between a lower sealing layer 102 and a structuring fluidic layer 103 of the device, by means of a spindle 11, which may preferably be metallic or else may be made, for example, of plastic. The sealing layer 102 and the fluidic layer 103 are made of polycarbonate, for example. The spindle 11 is inserted into corresponding indentations or abutments of the layers 102 and 103. In this embodiment the centrifuge cup 10 is closed off internally in the upper region by a sealing ring (O-ring) 12. This sealing ring 12 realizes a centripetal force-dependent valve function. The liquid 1 within the centrifuge cup 10 is rotated together with the centrifuge cup 10. The liquid 1 may be, for example, a blood sample, introduced directly into the centrifuge cup 10 beforehand via the sample inlet opening 104 in arrow direction. The actual drive for the rotation of the centrifuge cup 10 may be accomplished in a variety of ways, as for example by a direct mechanical intervention of a drive motor by mechanical "drivers" or by a magnetic coupling or a magnetic rotational field, or pneumatically.

During operation, the centrifuge cup 10 is arranged preferably with a particular tilt angle, preferably with a tilt angle of about 30°. This tilt angle may be realized, for example, by positioning of the entire microfluidic device 100 at a corresponding angle in a processing apparatus. The rotation of the centrifuge cup 10 produces centripetal forces, and so the sample liquid 1 lies against the wall of the centrifuge cup 10 with a certain pressure. Up to a certain threshold value, the sealing face between the sealing ring 12 and the wall of the centrifuge cup 10 withstands the prevailing pressure, allowing centrifugation to take place over a certain time at the corresponding speed until, for example, all of the cellular constituents have deposited on the wall of the centrifuge cup 10. When this state has been reached, the speed of the centrifuge cup 10 is increased, and so the threshold pressure is exceeded at the sealing face and the liquid freed from cellular constituents (for example, the plasma after centrifugation of a whole blood sample) is pressed through the sealing face between sealing ring 12 and internal wall of the centrifuge cup 10. The centrifugate—the plasma, for example—is spun into the sample input chamber 101 and can then be coupled via a sample chamber outlet 105 into the fluidic network of the microfluidic device 100. Provision may optionally be made for the liquid to be collected before the exit 105.

Figure 2:
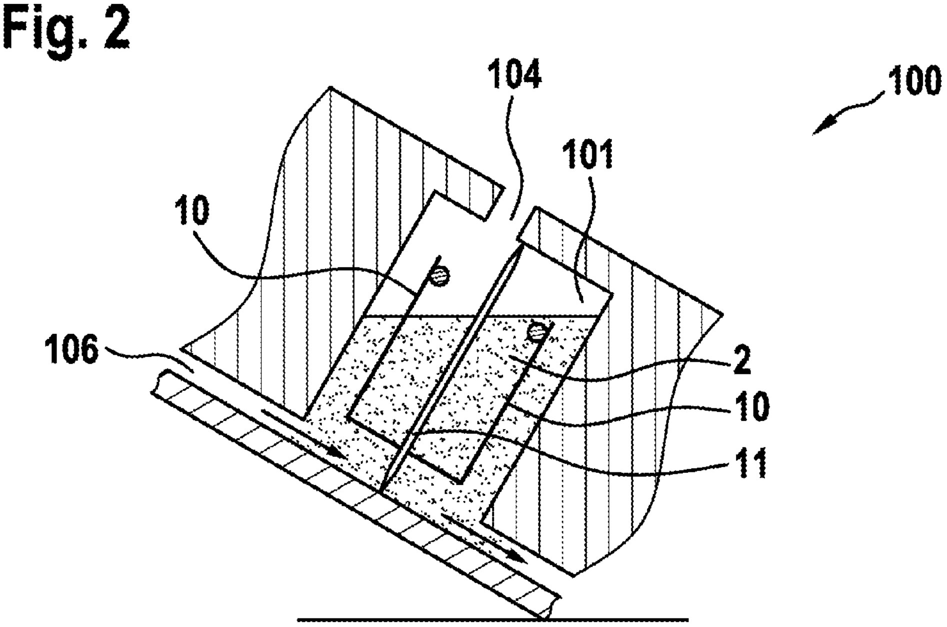
FIG. 2 shows a schematic section of the embodiment from FIG. 1 to illustrate a rinsing procedure.

Opening into the sample input chamber 101, below the centrifuge cup 10, is a further fluidic entry 106, with which, for example, the region in which the centrifugate spins out and/or the sample chamber outlet 105 and/or the centrifuge cup 10 itself are cleaned and/or rinsed with appropriate medium, as illustrated in FIG. 2. Via the fluidic entry 106 a further liquid 2 is introduced from below into the sample input chamber 101. The liquid level of the liquid 2 here may rise above the lower-lying edge of the centrifuge cup 10 in the sample input chamber 101, and so the liquid 2 penetrates into the centrifuge cup 10 and refills it. The degree of filling of the centrifuge cup 10 can be controlled by the amount of the liquid 2 supplied. The 30° degree inclination of the centrifuge cup 10 is particularly useful here, since this inclination causes the liquid 2 to cross into the centrifuge cup 10 at a defined location, thereby making it possible, for example, to prevent the centrifuge cup 10 being filled with excessive liquid. For a rinsing process, the liquid 2 can be centrifuged out of the centrifuge cup 10 again subsequently. The cycle of filling and centrifuging (rinsing) may be repeated multiply one after another, and, depending on particular application, the liquids which have been centrifuged off may each be wholly or partly processed further in the microfluidic device or else discarded.

Figure 3:
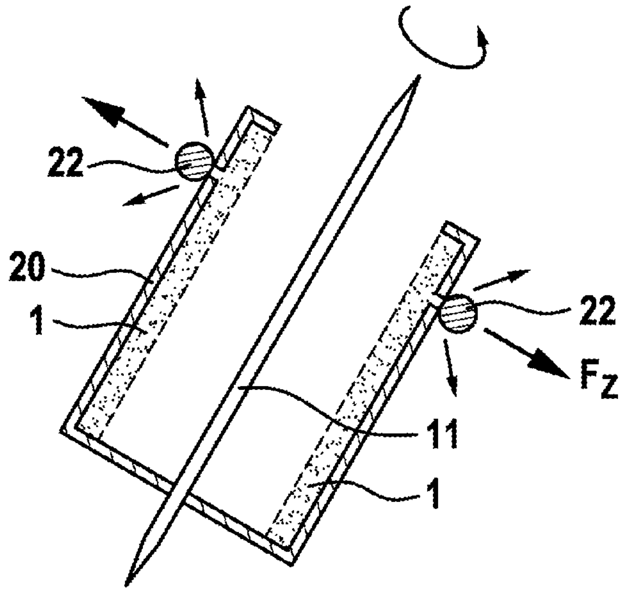
FIG. 3 shows a schematic section of a further embodiment of a centrifuge unit.

FIG. 3 shows a further, particularly preferred embodiment of a centripetal force-dependent valve function. In this case an externally peripheral sealing ring 22 is provided in the upper region of the centrifuge cup 20, and closes openings in the wall of the centrifuge cup 20. The centrifuge cup 20 is equipped toward the top with an internally protruding rim 23, in order to prevent the liquid 1 escaping from the centrifuge cup 20 at a low speed. This embodiment with external sealing ring 22 has the advantage that the centripetal forces Fc acting on the sealing ring 22 stretch the ring away from the sealing face and/or reduce its sealing force with respect to the external face of the centrifuge cup 20. Accordingly a greater proportion of the liquid 1 can be centrifuged off from the centrifuge cup 20, since, in comparison with the embodiment in FIGS. 1 and 2, the mass of liquid is no longer the only determining factor for the pressure conditions at the seal. With particular preference the sealing ring 22 and the rotational forces are harmonized with one another in such a way that the centripetal forces alone are sufficient to open the valve formed by sealing ring 22 and external wall of the centrifuge cup 20. This has the particular advantage that the entire quantity of liquid can be centrifuged off without residues remaining in the centrifuge cup 20. For this purpose a relatively supple material (e.g., a supple rubber ring) is usefully used for the sealing ring 22, readily stretchable by exposure to the centripetal force. The embodiment with an external sealing ring 22, relative to an internal sealing ring in accordance with the embodiment in FIGS. 1 and 2, has the advantage that, even when speeds are high and there is little liquid in the centrifuge cup 20, it is still possible for liquid to pass through the sealing face between sealing ring 22 and the wall of the centrifuge cup 20.

Figure 4:
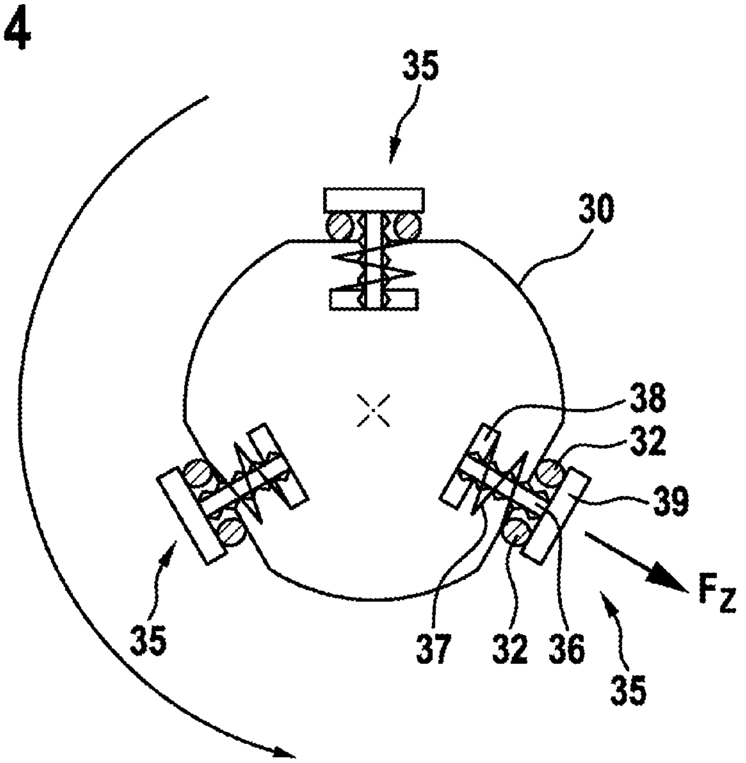
FIG. 4 shows a schematic plan view of a centrifuge unit in a further preferred embodiment.

FIG. 4 shows a particularly preferred exemplary embodiment of a centripetal force-dependent valve function 35 for a centrifuge unit. Shown here in plan view are three valves 35, integrated into the wall of the centrifuge cup 30. The valves 35 distributed over the periphery of the centrifuge cup 30 are formed by a bolt 36 which passes through the wall of the centrifuge cup 30. The openings provided for this purpose in the centrifuge cup 30 are somewhat larger than the diameter of the respective bolt 36, so that the bolt 36 is freely movable within the opening. On the inside of the centrifuge cup 30, the bolt 36 is provided with a compression spring (return spring) 37 and a retaining nut (e.g. locknut 38) or other securement. Located on the external side of the valve 35 is a bolt head 39 on the bolt 36. Between bolt head 39 and the wall of the centrifuge cup 30 there is a peripheral sealing ring 32, which seals off the opening externally. By means of the compression spring 37, which presses in the direction of the locknut 38, the bolt head 39 is tightened on the outside sealing ring 32 and presses it against the external wall of the centrifuge cup 30. This results in tight closure of the passage opening. When the centrifuge cup 30 is rotated, the centripetal force $F_C$ acts against the spring force of the compression spring 37. At a particular speed, the centripetal force $F_C$ is sufficient to expose the openings for the passage of liquid, and so the liquid centrifuged in the centrifuge cup 30 emerges from the centrifuge cup 30 and is able to pass into the microfluidic network of the device, which is not shown in more detail here.

The speed threshold which must be achieved for actuation of the valve 35 in this way is determined by the mass of each bolt 36 with the locknut 38 located on it, and also by the spring force of the compression spring 37 which counteracts it. A part is additionally played by the position of the locknut 38 in relation to the bolt 36. If the bolt 36 is provided with a thread, the locknut 38 can easily be altered in its position, thereby enabling adjustment of the pretension of the compression spring 37 and hence its retaining force. Biocompatible materials in particular are suitable materials for the individual components of the valve 35. For example, stainless steel socket-head screws M4×12 with M4 nuts can be used, together with a silicone O-ring (e.g., 4×2 mm) and steel springs. These illustrative dimensions are suitable for centrifuge units in which the centrifuge cup has a diameter, for example, of 3-4 cm. For smaller centrifuge units, which are suitable especially for commercially customary microfluidic devices, and which preferably have a centrifuge cup diameter of about 5 to 20 mm, more particularly 5 to 15 mm, 10 mm for example, the dimensions chosen for the components for the valve function should be reduced accordingly. Alternatively to screws it is possible to use threadless bolts, and alternatively to nuts it is possible to use, for example, tap rings or circlips or self-retaining clamping rings, which are placed on and/or pressed on.

Through the choice of suitable components and materials, for example, the valve function may be configured such that the valves open and the transfer of liquid can take place at a speed of 10 000 rpm. The diameter chosen for the openings within the wall of the centrifuge cup may be 1 mm, for example. It is possible, for example, to use three openings each of 1 mm in the periphery of the centrifuge cup. For different applications it may be advantageous to keep the openings for the passage of liquid relatively small, possibly even smaller than 1 mm in diameter, in order to prevent the transfer of cells. This may be sensible in particular when a centrifuge unit is to be used to obtain cell-free plasma from whole blood. Another result of relatively small openings may be that there is no unwanted centrifugal removal of cells, in those applications, for example, in which erythrocytes in whole blood are first selectively lyzed, centrifuged off and discarded, before other blood cells, leucocytes, for example, which have been retained in the centrifuge cup are to be lyzed and, for example, their nucleic acids extracted and processed further.

Relatively small openings have the disadvantage, however, that even at high speeds the complete transfer of the liquid from the centrifuge cup to the outside may require a certain time interval, 1-2 minutes for example. This may be a drawback in those cases in which during this time interval a previously resuspended cell material would be centrifuged again against the internal walls of the centrifuge cup. For such cases in particular, though also generally for cases in which rapid transfer of liquid is to take place for other reasons, relatively large openings may be advantageous for the transfer of liquid. Provision may be made, for example, for relatively large openings in the centrifuge cup to be provided additionally, in addition to the reversible valve functions described with relatively small openings, these relatively large openings breaking open irreversibly and allowing a very rapid transfer of liquid only at or above a very high speed and/or only at or above a very large acting centripetal force.

Figure 5:
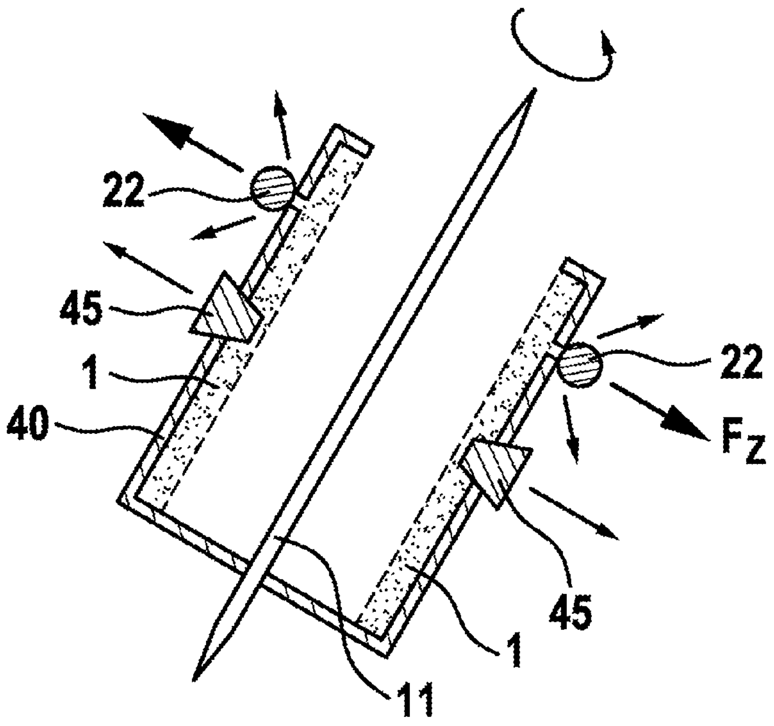
FIG. 5 shows a schematic section of a further preferred embodiment of a centrifuge unit with reversible and irreversible valve functions.

FIG. 5 illustrates, in schematic section, a centrifuge cup 40 having a reversible valve function which is realized by an externally peripheral sealing ring 22 which, comparably with the embodiment in FIG. 3, closes openings within the wall of the centrifuge cup 40 in a manner dependent on centripetal force. In the wall of the centrifuge cup 40, additionally, there are further openings, preferably larger in diameter, which in this exemplary embodiment are closed by stoppers 45. These openings may alternatively be closed by adhesive tape, for example. The relatively large openings closed by stoppers 45 or other closure means break open irreversibly when the speed is appropriately high and discharge the liquid 1 from the centrifuge cup 40 very quickly. For the application, for example, of the recovery of washed cells from the centrifuge cup 40, this embodiment ensures that, during the very short time interval of the transfer of the detached cells from the centrifuge cup 40, the resuspended cells do not adhere again to the internal wall of the centrifuge cup 40, as would be the case in the event of prolonged spinning. The irreversible breaking-open of the stoppers 45 by adhesive tape adhered externally to the centrifuge cup 40 in the region of the stoppers 45, for example, can be achieved by the adhesive force failing at or above a certain magnitude of the acting centripetal force or at or above a certain threshold speed, and irreversibly exposing the openings. The closure may also be configured, for example, by means of a metal foil in such a way that the metal foil tears irreversibly above the aforementioned threshold speed. In a further embodiment, the openings may be closed with stoppers, plastic or metal stoppers for example, which shoot out when the centripetal force reaches a certain height or when the threshold speed is exceeded, and suddenly expose the openings. Through a combination of such irreversible valve functions with reversible valve functions, in particular, there are diverse possible uses for the centrifuge unit integrated into a microfluidic device. The combination shown in FIG. 5 of the reversible valve function from FIG. 3 and the irreversible valve function (e.g. stoppers 45) is merely an example. In other embodiments, for example, the valve function (e.g. valve 35) from FIG. 4 may be combined with an irreversible valve function.

Through targeted actuation of the centripetal force-dependent valve functions, by setting of the required speeds and also, optionally, by the use of selective lysis media and/or extraction media, it is possible to use the integrated centrifuge unit to carry out specific operations in the processing of the sample, such as, for example, the selective lysis of particular cells and/or, for example, the extraction of nucleic acids or the like.

A microfluidic device incorporating a centrifuge unit of this kind may be utilized, for example, for the removal of cellular material from whole blood and for recovery of the resultant cell-free blood plasma. From the cell-free blood plasma it is then possible, for example, for circulating cell-free tumoral DNA or other nucleic acids contained in the plasma to be isolated and analyzed. For the implementation of this processing, first of all a (whole) blood sample is input through a sample inlet directly into the centrifuge cup, using a pipette, for example. At a medium centrifuge speed, the cellular material (leucocytes, erythrocytes, circulating tumor cells, etc.) is first centrifuged over a sufficiently small time interval onto the internal wall of the centrifuge cup. Roughnesses or nanostructures or indentations made in a targeted way in the internal wall of the centrifuge cup here may further assist adhesion of the cells to the wall. The centrifuge speed is subsequently raised above a predeterminable threshold value, causing the triggering of the valve function in the manner described and spinning the cell-free blood plasma from the centrifuge cup, allowing it to be coupled into the fluidic network of the microfluidic device.

Another application example for a microfluidic device of this kind is the removal of erythrocytes and the purification and lysis of the remaining cells and also the extraction of the nucleic acids obtained from them. In this exemplary embodiment, following introduction, for example, of the whole blood sample into the centrifuge cup, a medium selective for erythrocyte lysis (an ammonium chloride solution, for example) is added in the required amount to the centrifuge cup. This erythrocyte lysis medium causes the red blood corpuscles to burst. After a sufficiently long waiting time, the centrifugation process is commenced at a medium speed, with the valve function still remaining closed. Leucocytes and any circulating tumor cells (CTCs) are sedimented onto the wall of the centrifuge cup, and surface structures on the internal wall of the centrifuge cup may reinforce the adhesion in the wall. After a sufficiently long centrifugation time, the speed is raised so that the valve function opens and the "supernatant" liquid, including the erythrocyte lysate, is spun out of the centrifuge cup and discarded. Then the sample input chamber and/or the centrifuge cup may be rinsed one or more times and freed from erythrocyte residues, for example. During rinsing, the cells, especially the leucocytes, remain adhering on the inner wall surface of the centrifuge cup, and so rinsing steps purify the cellular material on the wall of the centrifuge cup and remove impurities. Finally a lysis buffer is added to lyze the cell material on the wall of the centrifuge cup and the nucleic acids are released as a result. In the concluding centrifuging step, at high speed, the lysis medium with the nucleic acids contained therein is transferred out of the centrifuge cup into the sample input chamber and taken over into the fluidic network of the microfluidic device. As and when required, the media used may be temperature-conditioned, more particularly heated or cooled, and the lysis of the cells may be promoted by a heated lysis medium, for example.

In a further application example, erythrocytes may be removed from a whole blood sample and the remaining cells may be coupled into the fluidic network of the microfluidic device, where they are put to further use. After the input, for example, of a whole blood sample into the centrifuge cup, purification is commenced first by the metered addition of a lysis medium selective for erythrocyte lysis, ammonium chloride solution for example, in the desired amount into the centrifuge cup, by flooding, for example. Following the subsequent lysis of the erythrocytes, the centrifugation process is commenced at a medium speed, with leucocytes and any circulating tumor cells being sedimented onto the centrifuge cup wall, supported where appropriate by structurings on the inner wall surface of the centrifuge cup. After a sufficiently long centrifugation time, the speed is raised so that the valve function opens and the "supernatant" liquid is spun out of the centrifuge cup and discarded. The sample input chamber and/or the centrifuge cup are subsequently rinsed one or more times and in particular freed from erythrocyte residues. The remaining cellular constituents of the sample, freed from the erythrocytes, are present in the interior of the centrifuge cup and can be washed by the optional rinsing steps. Lastly a further medium is introduced in the desired amount into the centrifuge cup, in order to detach the cells present on the wall of the centrifuge cup. For this purpose it is possible to use, for example, an EDTA-containing medium. Detachment of the cells from the wall may be accomplished by leaving the cup to stand or may be assisted, for example, by slow rotation of the centrifuge cup with a periodic change in the direction of rotation. The rotational speed chosen here is usefully kept low enough that centripetal forces play no part in the sense of cell sedimentation, yet the liquid column keeps the entire internal wall of the centrifuge cup covered, and at the same time a transient flow is formed in the centrifuge cup. The eddying triggered by a change in the direction of rotation preferably facilitates the detachment of the cells from the inner wall of the centrifuge cup and so facilitates the transit of the cells into the liquid. In a last centrifuging step, preferably with a sharply commencing high speed, the detached cells within the medium are spun through the opened valves into the sample input chamber and transferred into the channel system of the microfluidic device. Provision may be made here for the sample material first to be collected, by appropriate connection of the channels in the microfluidic device, before the material enters into the actual channel system. In this application example as well, the temperature of the media used may be adjusted by preheating or precooling in order to support the processes.

The application examples for the integrated centrifuge unit, elucidated here with reference to whole blood samples, can also be applied to other sample liquids, and the centrifuge unit integrated into a microfluidic device may be utilized in principle for all microfluidic processes which rationally include a centrifuging step.

The invention claimed is:

1. A microfluidic device for processing of liquid samples, comprising:
   - at least one centrifuge unit comprising:
     - a centrifuge cup; and
     - at least one centripetal force-dependent valve arrangement,
   - wherein the at least one centrifuge cup is mounted rotatably between two layers of the microfluidic device.

2. The microfluidic device as claimed in claim 1, wherein the at least one centripetal force-dependent valve arrangement is a reversible valve arrangement.

3. The microfluidic device as claimed in claim 1, wherein the at least one centripetal force-dependent valve arrangement includes at least one sealing ring.

4. The microfluidic device as claimed in claim 3, wherein the at least one sealing ring externally surrounds the centrifuge cup and reversibly exposes or closes openings in the centrifuge cup as a function of an acting centripetal force.

5. The microfluidic device as claimed in claim 1, wherein the at least one centripetal force-dependent valve arrangement comprises:
   - at least one opening defined in a wall of the centrifuge cup;
   - a bolt movably arranged in the at least one opening and passing through the wall, the bolt having a bolt head arranged outside the centrifuge cup and a sealing ring below the bolt head,
   - wherein, below a predeterminable centripetal force, the bolt is held within the centrifuge cup in a sealing position by a secured compression spring.

6. The microfluidic device as claimed in claim 5, wherein the compression spring is secured by a locknut which is mounted in an interior of the centrifuge cup on a thread of the bolt.

7. The microfluidic device as claimed in claim 1, wherein the at least one centripetal force-dependent valve arrangement is an irreversible valve arrangement.

8. The microfluidic device as claimed in claim 7, wherein the irreversible valve arrangement is actuated at a higher centripetal force than an additional reversible valve arrangement.

9. The microfluidic device as claimed in claim 1, wherein the centrifuge cup is equipped at least partly with surface structures configured for adherence of sample constituents.

10. The microfluidic device as claimed in claim 1, wherein the at least one centrifuge cup is configured to be arranged at a tilt angle between 10 and 50° during the processing.

11. The microfluidic device as claimed in claim 1, further comprising:

an integration region within the microfluidic device configured to receive the centrifuge unit, the integration region defining a fluidic entry configured for introducing fluids into the microfluidic device independently of the at least one centrifuge unit.

12. The microfluidic device as claimed in claim 1, wherein the centrifuge cup is mounted rotatably between the two layers by a spindle.

13. A method for operating a microfluidic device with a centrifuge unit having (i) a centrifuge cup that is mounted rotatably between two layers of the microfluidic device and (ii) at least one centripetal force-dependent valve arrangement, the method comprising:

after introduction of the sample into the centrifuge cup, rotating the centrifuge cup between the two layers at a first speed in a first phase and rotating the centrifuge cup between the two layers at a second, increased speed in a subsequent second phase, wherein the increased speed causes actuation of the at least one centripetal force-dependent valve arrangement of the centrifuge unit.

14. The method as claimed in claim 13, further comprising:

refilling the centrifuge cup repeatedly by flooding the centrifuge cup with a liquid.

15. The method as claimed in claim 13, further comprising:

removing cellular constituents of a sample and/or lyzing cellular constituents and/or selectively isolating particular cellular constituents of a sample via the rotation of the centrifuge cup at the first speed and the rotation of the centrifuge cup at the second speed.

* * * * *